United States Patent
Kim et al.

(10) Patent No.: US 12,441,588 B2
(45) Date of Patent: Oct. 14, 2025

(54) MOVING HANDRAIL STERILIZING APPARATUS

(71) Applicant: KOREA AIRPORTS CORPORATION, Seoul (KR)

(72) Inventors: Jin Oh Kim, Seoul (KR); Eui Soo Jung, Seoul (KR); Il Gon You, Gimpo-si (KR); Ju Young Kim, Yongin-si (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 156 days.

(21) Appl. No.: 18/253,769

(22) PCT Filed: Dec. 24, 2021

(86) PCT No.: PCT/KR2021/019875
§ 371 (c)(1),
(2) Date: May 19, 2023

(87) PCT Pub. No.: WO2022/149775
PCT Pub. Date: Jul. 14, 2022

(65) Prior Publication Data
US 2024/0367945 A1    Nov. 7, 2024

(30) Foreign Application Priority Data
Jan. 5, 2021   (KR) .................. 10-2021-0000734

(51) Int. Cl.
*B66B 31/02*     (2006.01)
*A46B 9/02*     (2006.01)
(Continued)

(52) U.S. Cl.
CPC .............. *B66B 31/02* (2013.01); *A46B 9/026* (2013.01); *A46D 1/006* (2013.01); *A61L 2/10* (2013.01);
(Continued)

(58) Field of Classification Search
CPC .................................................... B66B 31/02
See application file for complete search history.

(56) References Cited

U.S. PATENT DOCUMENTS 5,117,968 A * 6/1992 Rivera ................... B65G 45/18
198/496
9,833,527 B1 * 12/2017 Ting ........................ B66B 31/02
(Continued)

FOREIGN PATENT DOCUMENTS

CN     206885708 U  *  1/2018
CN     209827657 U  * 12/2019
(Continued)

OTHER PUBLICATIONS

Extended European Search Report issued in EP 21 91 7936.3-1014 by the European Patent Office on Oct. 8, 2024, which is related to U.S. Appl. No. 18/253,769.
(Continued)

*Primary Examiner* — Omair Chaudhri
(74) *Attorney, Agent, or Firm* — Studebaker Brackett PLLC

(57) ABSTRACT

Disclosed is a moving handrail sterilizing apparatus. The moving handrail sterilizing apparatus includes: a moving handrail; a first sterilizing unit which is disposed so as to be in contact with one side of the moving handrail and wipes away foreign substances on a surface of the handrail; a sterilizing panel which is disposed on one side of the first sterilizing unit and irradiates the first sterilizing unit with ultraviolet rays and plasma; a second sterilizing unit, which is spaced a certain distance from the first sterilizing unit along the direction in which the moving handrail moves, is provided below the moving handrail and provides a sterilizing agent to the moving handrail; and an air blower fan which is disposed between the second sterilizing unit and the
(Continued)

moving handrail and blows air so that the sterilizing agent is uniformly supplied to the moving handrail.

5 Claims, 3 Drawing Sheets

(51) Int. Cl.
| | | |
|---|---|---|
| *A46D 1/00* | (2006.01) | |
| *A61L 2/10* | (2006.01) | |
| *A61L 2/14* | (2006.01) | |
| *A61L 2/20* | (2006.01) | |
| *B08B 1/12* | (2024.01) | |
| *B08B 1/20* | (2024.01) | |
| *B08B 1/34* | (2024.01) | |
| *B08B 7/00* | (2006.01) | |
| *A61L 101/06* | (2006.01) | |

(52) U.S. Cl.
CPC ...................... *A61L 2/14* (2013.01); *A61L 2/20* (2013.01); *B08B 1/12* (2024.01); *B08B 1/20* (2024.01); *B08B 1/34* (2024.01); *B08B 7/0057* (2013.01); *A46B 2200/3073* (2013.01); *A61L 2101/06* (2020.08); *A61L 2202/11* (2013.01); *A61L 2202/15* (2013.01); *A61L 2202/16* (2013.01); *A61L 2202/17* (2013.01)

(56) References Cited

U.S. PATENT DOCUMENTS

| | | | | |
|---|---|---|---|---|
| 2011/0158862 | A1* | 6/2011 | Kim | ............ B66B 31/02 422/292 |
| 2012/0241284 | A1* | 9/2012 | Kobayashi | ............ B66B 31/02 156/345.1 |
| 2022/0112053 | A1* | 4/2022 | Park | ............ A61L 2/18 |
| 2023/0270899 | A1* | 8/2023 | Donaldson | ............ A61L 9/122 422/1 |
| 2023/0312308 | A1* | 10/2023 | Bauer | ............ B66B 23/24 198/335 |

FOREIGN PATENT DOCUMENTS

| | | | | |
|---|---|---|---|---|
| CN | 111237908 A | | 6/2020 | |
| CN | 111632980 A | * | 9/2020 | ............ B08B 1/002 |
| CN | 211903138 U | * | 11/2020 | |
| CN | 212230448 U | | 12/2020 | |
| CN | 112376656 A | * | 2/2021 | ............ B01D 29/96 |
| JP | 2012-046272 A | | 3/2012 | |
| JP | 2012082054 A | * | 4/2012 | ............ B66B 31/02 |
| JP | 2012-197154 A | | 10/2012 | |
| KR | 20060018333 A | * | 3/2006 | |
| KR | 10-2006-0108189 A | | 10/2006 | |
| KR | 20060108189 A | * | 10/2006 | |
| KR | 100947368 B1 | * | 3/2010 | |
| KR | 100954691 B1 | * | 4/2010 | |
| KR | 100994641 B1 | * | 11/2010 | |
| KR | 101166259 B1 | * | 7/2012 | |
| KR | 10-2013-0018756 A | | 2/2013 | |
| KR | 10-2014-0145214 A | | 12/2014 | |
| KR | 101582229 B1 | * | 1/2016 | |
| KR | 200491410 Y1 | * | 4/2020 | |
| WO | 2020/111415 A1 | | 6/2020 | |
| WO | WO-2022029715 A1 | * | 2/2022 | |

OTHER PUBLICATIONS

International Search Report issued in PCT/KR2021/019875; mailed Apr. 6, 2022.
An Office Action; mailed by the China National Intellectual Property Administration of the People's Republic of China on Jul. 31, 2025, which corresponds to Chinese Patent Application No. 2021800732535.1 and is related to U.S. Appl. No. 18/253,769.

* cited by examiner

MOVING HANDRAIL STERILIZING APPARATUS

CROSS-REFERENCE TO RELATED APPLICATION

This application is the U.S. National Stage of International Application No. PCT/KR2021/019875, filed on Dec. 24, 2021, which claims benefit and priority to Korean Patent Application No. 10-2021-0000734, filed on Jan. 5, 2021, with the Korean Intellectual Property Office, the disclosure of which is incorporated herein in its entirety by reference.

BACKGROUND

Technical Field

The embodiments below relate to a moving handrail sterilizing apparatus.

Background Art

Escalators and moving walks are mainly installed in multi-use facilities such as subways, department stores, and airports with a large floating population. A handrail is installed on the side of the escalator or moving walk so that people may hold onto the handrail and move safely. The handrail is a point where as many as tens of thousands of hands touch each day, and is vulnerable to hygiene management. The handrail is easily contaminated with germs and may pass on germs to other people. With an issue as such, it is essential to keep the handrail clean. In particular, due to the recent worldwide epidemic of the COVID-19 virus, people's interest in cleanliness and disinfection of public facilities is increasing.

In general, handrails of escalators and moving walks are cleaned by cleaners, and germs and foreign substances are removed by wiping them with a wet towel or alcohol. However, this method is labor-intensive and is inefficient in terms of economic aspects. In addition, there is a disadvantage that health issues may occur due to exposure of the cleaners to disinfectant.

Alternatively, there is a method of installing a sterilizing apparatus on a handrail. This method generally includes a liquid disinfectant spray method and an ultraviolet sterilization method. Since the liquid disinfectant spray method requires a disinfectant storage tank, this method is cumbersome in terms of maintenance and is inefficient in terms of space utilization. In addition, since the disinfectant comes out on the handrail, it may cause discomfort to users and cause discoloration of the handrail. The ultraviolet sterilization method is the most commonly used method, but it is over-compressed to the handrail to be self-powered, which may cause damage to the handrail, and may harden the rubber handrail due to continuous ultraviolet heat generation. In addition, there is a disadvantage that a product needs to be reinstalled when an escalator operates in a reverse direction.

The above background art has been possessed or acquired by the inventors in the process of deriving the disclosure of the present application, and is not necessarily an art publicly known before the present application was filed.

SUMMARY

An aspect of the embodiment is directed to providing a moving handrail sterilizing apparatus having high sterilization efficiency without causing deformation of the surface of a handrail.

The aspects of the embodiments are not limited to those mentioned above, and other aspects not mentioned herein will be clearly understood by those skilled in the art from the following description.

Disclosed is a moving handrail sterilizing apparatus according to an embodiment.

The moving handrail sterilizing apparatus includes: a moving handrail; a first sterilizing unit which is disposed so as to be in contact with one side of the moving handrail and wipes away foreign substances on a surface of the handrail: a sterilizing panel which is disposed on one side of the first sterilizing unit and irradiates the first sterilizing unit with ultraviolet rays and plasma: a second sterilizing unit, which is spaced a certain distance from the first sterilizing unit along the direction in which the moving handrail moves, is provided below the moving handrail and provides a sterilizing agent to the moving handrail; and an air blower fan which is disposed between the second sterilizing unit and the moving handrail and blows air so that the sterilizing agent is uniformly supplied to the moving handrail.

According to an aspect, the first sterilizing unit may be a brush made of an antibacterial material.

According to an aspect, the brush may have a cylindrical shape and may be provided rotatably in conjunction with the movement of the handrail.

According to an aspect, the sterilizing panel may include a plasma generator for generating LED and plasma for generating ultraviolet rays.

According to an aspect, the second sterilizing unit may include a chlorine dioxide solid agent that sublimes at room temperature.

According to an aspect, the air blower fan may form an airflow in the periphery of the second sterilizing unit so as to face the surface of the moving handrail.

Advantageous Effects

As described above, according to the embodiments, a moving handrail sterilizing apparatus can efficiently sterilize a handrail without causing deformation of the surface of the handrail surface.

The benefits of the moving handrail sterilizing apparatus according to an embodiment are not limited to those mentioned above, and other benefits not mentioned herein will be clearly understood by those skilled in the art from the following description.

Figure 1:
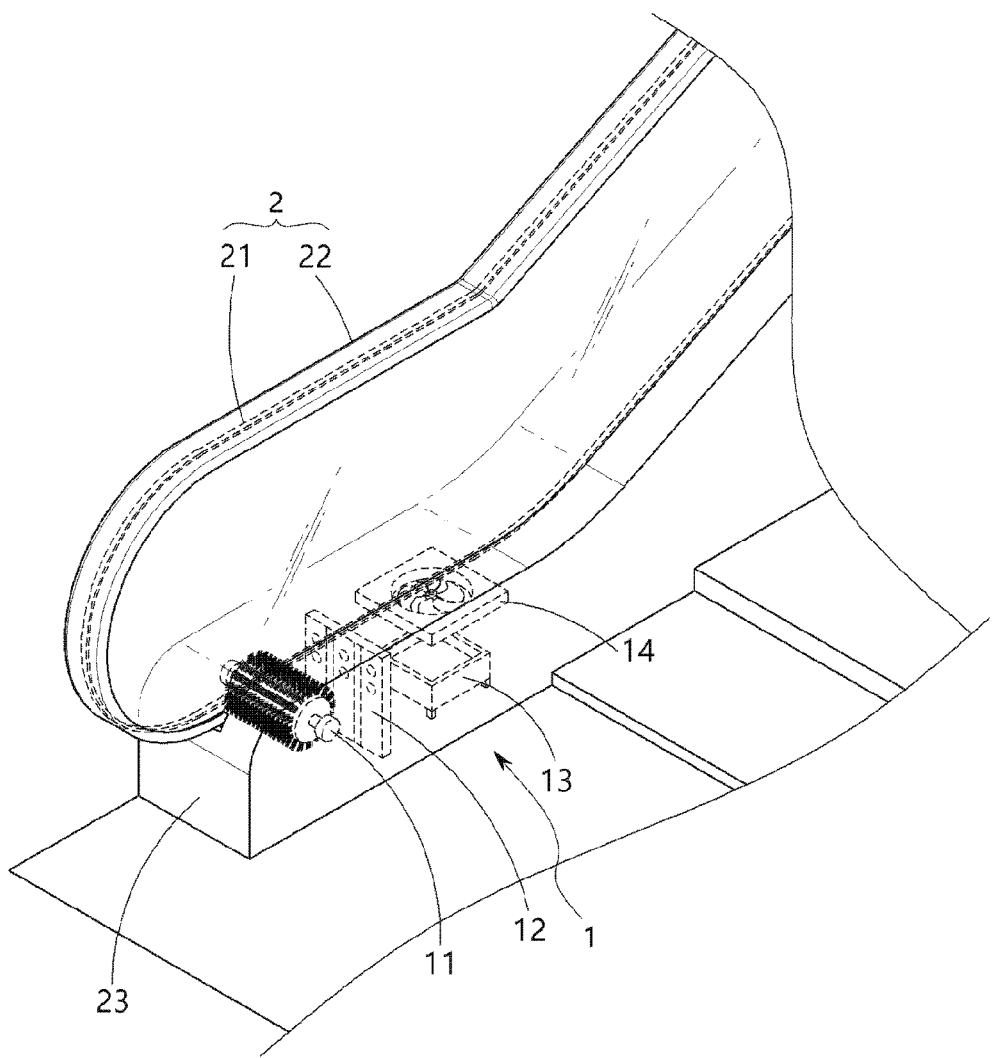
FIG. 1 is a perspective view of a state in which a moving handrail sterilizing apparatus according to an embodiment is installed on a moving handrail.

The following drawings attached to this specification illustrate preferred embodiments of the present disclosure, and serve to further understand the technical idea of the present disclosure together with the detailed description of the present disclosure. The present disclosure should not be construed as being limited only to the matters described in such drawings.

DESCRIPTION OF EXEMPLARY EMBODIMENTS

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, in the description of example embodiments, a detailed description of well-known related structures or functions will be omitted when it is deemed that such description will cause an ambiguous interpretation of the present disclosure.

In addition, terms such as first, second, A, B, (a), (b), and the like may be used herein to describe components. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 2:
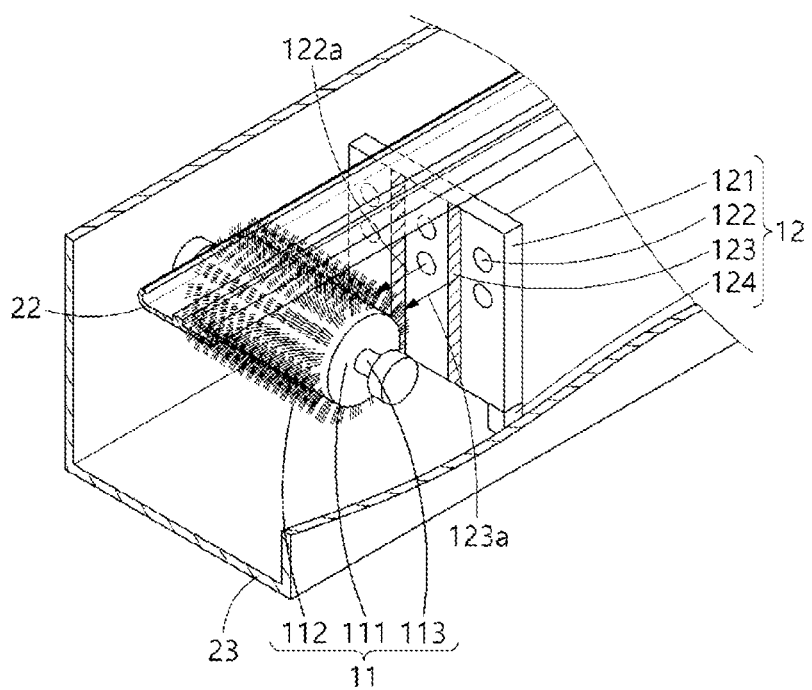
FIG. 2 is a view of positions where a first sterilizing unit and a sterilizing panel are disposed according to an embodiment.
Figure 3:
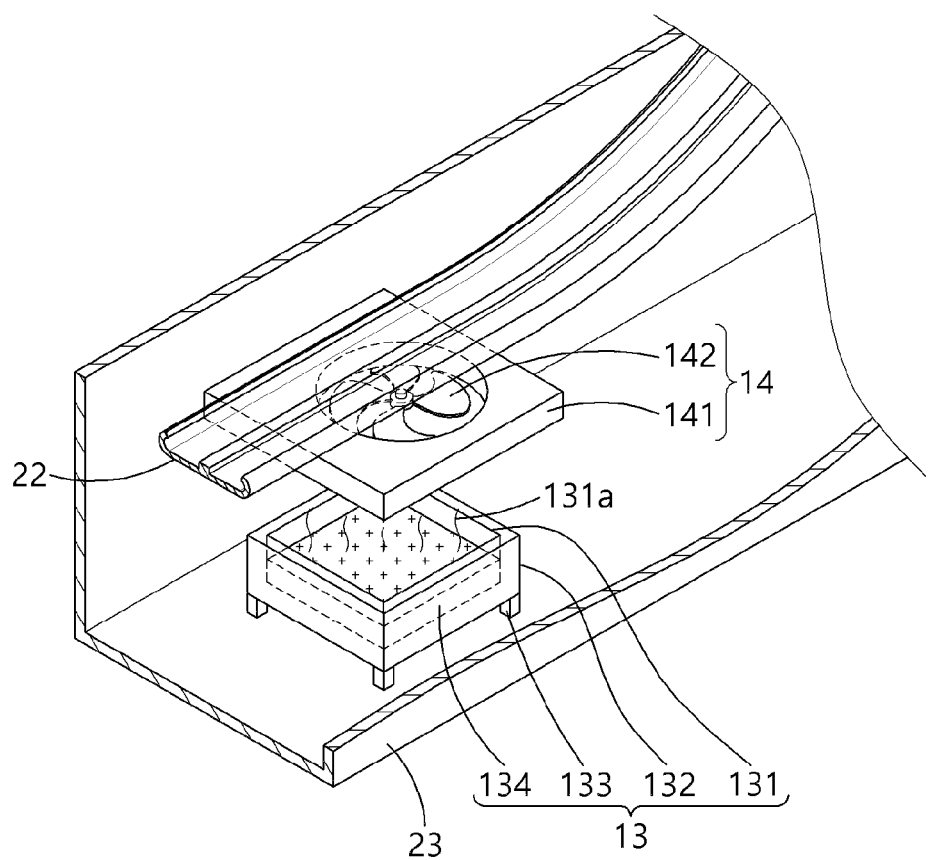
FIG. 3 is a view of positions where a second sterilizing unit and an air blower fan are disposed according to an embodiment.

FIG. 1 is a perspective view of a state in which a moving handrail sterilizing apparatus 1 according to an embodiment is installed on a moving handrail 2. FIG. 2 is a view of positions where a first sterilizing unit 11 and a sterilizing panel 12 are disposed according to an embodiment. FIG. 3 is a view of positions where a second sterilizing unit 13 and an air blower fan 14 are disposed according to an embodiment.

Referring to FIGS. 1 to 3, the moving handrail sterilizing apparatus 1 according to an embodiment is installed on the moving handrail 2 of an escalator or a moving walk, and may keep the surface of the moving handrail 2 clean by sterilizing a handrail in two stages.

In the moving handrail 2, a sprocket 21 forms an endless track, and a cover 22 is installed on the surface of the sprocket 21. Herein, the description of the detailed structure of the moving handrail 2 is omitted.

The first sterilizing unit 11 is installed inside a machine room 23 located below the moving handrail 2 and is disposed so as to be in contact with the cover 22 of the moving handrail 2. The first sterilizing unit 11 includes a cylindrical brush 111, a plurality of brush bristles 112 installed at regular intervals on a circumferential surface of the brush 111, and a shaft member 113. The cylindrical brush 111 is in contact with the moving handrail 2 without a separate driving device and rotates in conjunction with the movement of the moving handrail 2. Alternatively, the cylindrical brush 111 may have a configuration in which a separate driving device (not shown) is provided on the shaft member 113 to rotate independently of the moving handrail 2.

In this embodiment, the cylindrical brush 111 is in contact with the cover 22, and the plurality of brush bristles 112 installed on the circumferential surface of the brush 111 physically removes foreign substances attached to the cover 22 while rolling in conjunction with the movement of the moving handrail 2. The brush 111 and the brush bristles 112 are made of an antibacterial material to prevent the proliferation of bacteria contained in foreign substances separated from the moving handrail 2.

In addition, the first sterilizing unit 11 has a simple structure, and is configured to be detachable from an installation point. The first sterilizing unit 11 used for a long time may be easily replaced.

In order to sterilize the first sterilizing unit 11 more effectively and reliably, the sterilizing panel 12 is further provided.

The sterilizing panel 12 is disposed on one side of the first sterilizing unit 11, irradiates the first sterilizing unit 11 with ultraviolet rays and plasma to sterilize bacteria remaining in the first sterilizing unit 11, and prevents the transfer of bacteria from the first sterilizing unit 11 back to the moving handrail 2. The sterilizing panel 12 is configured of a panel 121, an LED 122 installed on the surface of the panel 121, a plasma generator 123, and a panel supporting unit 124 supporting the panel 121. In addition, although not shown, a power supply device and circuitry are further included.

The panel 121 is spaced a certain distance from the brush 111 of the first sterilizing unit 11 and is disposed to face at least one point on the outer circumferential surface of the brush 111. The panel 121 provides ultraviolet rays and plasma to the outer circumferential surface of the brush 111, and sterilization is performed on the entire surface of the brush 111 while the brush 111 rotates. In addition, the panel supporting unit 124 fixes the panel 121 in a certain position. The shapes of the panel 121 and the panel supporting unit 124 are not limited in the drawings, and the installation positions and shapes of the panel 121 and the panel supporting unit 124 may be substantially changed in various ways.

The LED 122 generates short-wavelength ultraviolet rays 122a with strong sterilizing power. The LED 122 may effectively sterilize bacteria, fungi, microorganisms, viruses, etc. present in the first sterilizing unit 11 by irradiating short-wavelength ultraviolet rays.

The plasma generator 123 generates plasma 123a. When plasma is generated, ion clusters are formed on the periphery, and bacteria, fungi, microorganisms, and viruses present in the first sterilizing unit 11 are sterilized by the ion clusters.

For reference, the LED 122 is a direct sterilization method in which short-wavelength ultraviolet rays directly act on the first sterilizing unit 11, and has a short-term sterilization effect for a small space. The plasma generator 123 is an indirect sterilization method in which charged particles act in the air around the first sterilizing unit 11 to remove bacteria, fungi, microorganisms, and viruses, and has a continuous sterilization effect for a wide space. According to this embodiment, the sterilizing panel 12 may produce an optimal sterilization effect by simultaneously performing two sterilization methods of providing ultraviolet rays and plasma.

The second sterilizing unit 13 is installed inside the lower machine room 23 of the moving handrail 2, and is spaced a certain distance from the first sterilizing unit 11 along the direction in which the moving handrail 2 moves.

The second sterilizing unit 13 is configured of a chlorine dioxide solid agent 131, a housing 132 having an open top for accommodating the chlorine dioxide solid agent 131, and a housing supporting unit 133 supporting the housing 132.

The chlorine dioxide solid agent 131 sublimes at room temperature to provide chlorine dioxide gas 131a to the periphery. The chlorine dioxide gas 131a is a strong oxidant that is easily soluble in water, is highly volatile, and has strong oxidation and bleaching properties, so it is used for disinfection, sterilization, and odor treatment. In addition, while other chlorine-based compounds generate carcinogens such as trihalomethane, the chlorine dioxide gas 131a is safe in that carcinogens are not generated.

The chlorine dioxide gas 131a generated on the surface of the chlorine dioxide solid agent 131 sterilizes bacteria, fungi, microorganisms, viruses, etc. remaining on the surface of the moving handrail 2, and forms a blocking layer to keep the surface of the moving handrail 2 clean.

The housing 132 is formed to a size capable of accommodating the chlorine dioxide solid agent 131 and has an open top. Herein, the housing 132 blocks the chlorine dioxide gas 131a sublimated from the chlorine dioxide solid agent 131 from spreading in all directions and serves to guide the chlorine dioxide gas 131a to flow in the direction of the moving handrail 2.

The housing 132 may include a sensor 134 that senses whether the chlorine dioxide solid agent 131 is exhausted. For example, the sensor 134 may be a device installed in the lower portion of the housing 132 to measure the weight of the chlorine dioxide solid agent 131. The sensor 134 may measure the weight of the chlorine dioxide solid agent 131, transmit information to an external system, and determine a replacement time.

In addition, the housing 132 and the chlorine dioxide solid agent 131 may be integrally provided so as to be easily replaced in a cartridge format.

The housing supporting unit 133 supporting the housing 132 is provided below the housing 132. The housing supporting portion 133 is formed to be able to adjust the length, so that the installation position of the chlorine dioxide solid agent 131 may be adjusted according to the distance between the ground and the moving handrail 2.

The air blower fan 14 is disposed between the second sterilizing unit 13 and the moving handrail 2, and the air blower fan 14 forms an airflow to uniformly supply the chlorine dioxide gas 131a to the moving handrail 2.

The air blower fan 14 includes a main body 141 and a wing unit 142.

The main body 141 fixes the wing unit 142 to a point between the second sterilizing unit 13 and the moving handrail 2. The main body 141 may have a connecting member formed to be installed on the inner wall of the machine room 23 below the moving handrail 2. Alternatively, a support unit may be additionally configured to the main body 141 so that it may be fixed from the ground. However, this is merely an example, and the configuration of the air blower fan 14 may be formed in various shapes so as to efficiently form an airflow.

The wing unit 142 is installed on the main body 141 and rotates to form an airflow around the second sterilizing unit 13. The wing unit 142 may be rotated by a motor (not shown). The wing unit 142 forms an airflow so that the chlorine dioxide gas 131a generated from the chlorine dioxide solid agent 131 located at a lower portion flows in the direction of the moving handrail 2. The wing unit 142 serves to constantly maintain the evaporation performance of the chlorine dioxide solid agent 131, which changes in the amount of vaporization according to the humidity of the air in the periphery.

According to this embodiment, the moving handrail sterilizing apparatus 1 has a simple configuration and is easy to miniaturize, so as to be flexibly installed without restrictions on the shape of the space.

In addition, the moving handrail sterilizing apparatus 1 may effectively remove germs on the surface of the moving handrail 2 through a multi-sterilization structure.

In addition, the moving handrail sterilizing apparatus 1 does not directly irradiate the moving handrail 2 with ultraviolet rays and uses a chemical sterilizing agent, thus enabling sterilization without causing deformation or discoloration of the surface of the moving handrail 2, complying with the Korean Industrial Standard (KS B 6852), and increasing the life span of the moving handrail 2.

In addition, the moving handrail sterilizing apparatus 1 does not use a liquid sterilizing agent, but uses a vaporized sterilizing agent, so that the sterilizing agent does not come out on the surface of the moving handrail 2, thereby reducing discomfort to passengers.

Although the embodiments have been described based on the limited embodiments and drawings as described above, those skilled in the pertinent technical field may apply various technical modifications and variations from the foregoing descriptions. For example, even when the described technologies are performed in a different order from that in the described method, and/or the described components such as system, structure, device, or circuit are coupled or combined in a manner different from that as described above, or are replaced or substituted with other components or equivalents, appropriate results may be achieved.

Therefore, other implementations, other embodiments, and equivalents to claims also fall within the scope of the following claims.

What is claimed is:
1. A moving handrail sterilizing apparatus including:
   a moving handrail;
   a first sterilizing unit which is disposed so as to be in contact with one side of the moving handrail and wipes away foreign substances on a surface of the handrail;

a sterilizing panel which is disposed on one side of the first sterilizing unit and irradiates the first sterilizing unit with ultraviolet rays and plasma;

a second sterilizing unit, which is spaced a certain distance from the first sterilizing unit along the direction in which the moving handrail moves, is provided below the moving handrail and provides a sterilizing agent to the moving handrail; and an air blower fan which is disposed between the second sterilizing unit and the moving handrail and blows air to uniformly supply the sterilizing agent to the moving handrail, wherein the air blower fan forms an airflow to evenly deliver chlorine dioxide gas onto the surface of the moving handrail.

2. The apparatus of claim 1, wherein the first sterilizing unit is a brush made of an antibacterial material to prevent the proliferation of bacteria contained in foreign substances separated from the moving handrail.

3. The apparatus of claim 2, wherein the brush has a cylindrical shape and is provided rotatably in conjunction with a movement of the handrail.

4. The apparatus of claim 1, wherein the sterilizing panel includes an LED for generating ultraviolet rays and a plasma generator for generating plasma.

5. The apparatus of claim 1, wherein the second sterilizing unit includes a chlorine dioxide solid agent as a sterilizing agent, and the chlorine dioxide solid agent sublimes into a gaseous state to perform a sterilizing action on the moving handrail.

* * * * *